United States Patent [19]
Rowe

[11] Patent Number: 5,240,641
[45] Date of Patent: Aug. 31, 1993

[54] SOLVENT MIXTURES HAVING ENHANCED EVAPORATION

[75] Inventor: Edward A. Rowe, Grand Island, N.Y.

[73] Assignee: Occidental Chemical Corporation, Niagara Falls, N.Y.

[21] Appl. No.: 844,061

[22] Filed: Mar. 2, 1992

[51] Int. Cl.$^5$ .............................................. C23G 5/028
[52] U.S. Cl. ..................................... 252/364; 134/10; 106/287.280; 106/311
[58] Field of Search ......................... 252/364; 106/311

[56] References Cited

U.S. PATENT DOCUMENTS 3,839,087 10/1974 Beckers .................... 260/625.5 R X
4,578,209 3/1986 Hisamoto et al. .................. 252/143

*Primary Examiner*—Gary Geist
*Attorney, Agent, or Firm*—Wayne A. Jones; Richard D. Fuerle

[57] ABSTRACT

Disclosed is a mixture of about 1 to about 99 volume percent monochlorotoluene and about 1 to about 99 volume percent monochlorobenzotrifluoride. Also disclosed is a mixture of about 10 to about 60 volume percent monochlorotoluene, about 10 to about 60 volume percent monochlorobenzotrifluoride, and about 30 to about 60 volume percent perchloroethylene. The mixtures are used as solvents to form coatings of organic polymers and to clean parts.

8 Claims, 2 Drawing Sheets

SOLVENT MIXTURES HAVING ENHANCED EVAPORATION

BACKGROUND OF INVENTION

This invention relates to solvent mixtures. In particular, it relates to mixtures of monochlorotoluene and monochlorobenzotrifluoride, which can optimally contain perchloroethylene.

1,1,1-trichloroethane has been a widely used solvent in many industries, because it is nonflammable, dissolves most soluble polymers, and evaporates quickly. However, it has been found to deplete the ozone layer in the stratosphere, and regulations now limit its use and it may soon be prohibited entirely for many applications. Users of 1,1,1-trichloroethane are presently searching for substitute solvents with the same desirable properties, but which will not attack the ozone layer.

SUMMARY OF THE INVENTION

I have discovered that mixtures of monochlorotoluene with monochlorobenzotrifluoride, especially when mixed with perchloroethylene, have almost the same desirable properties that 1,1,1-trichloroethane has, but are not expected to attack the ozone layer. Because about two years are required for a solvent released on the ground to reach the ozone layer in the stratosphere, and the solvents used in this invention have an atmospheric life in the troposphere of only about sixty days, they should not be ozone depleters. The solvent formulations of this invention are good solvents for most organic polymers, evaporate rapidly, and, when they include perchloroethylene, are nonflammable.

Very unexpectedly, I have discovered that even though parachlorobenzotrifluoride evaporates only about half as fast as perchloroethylene, nevertheless, some mixtures of parachlorobenzotrifluoride with orthochlorotoluene evaporate faster than do mixtures of perchloroethylene with orthochlorotoluene. As yet, I have found no explanation for this unusual phenomena.

DESCRIPTION OF THE INVENTION

Figure 1:
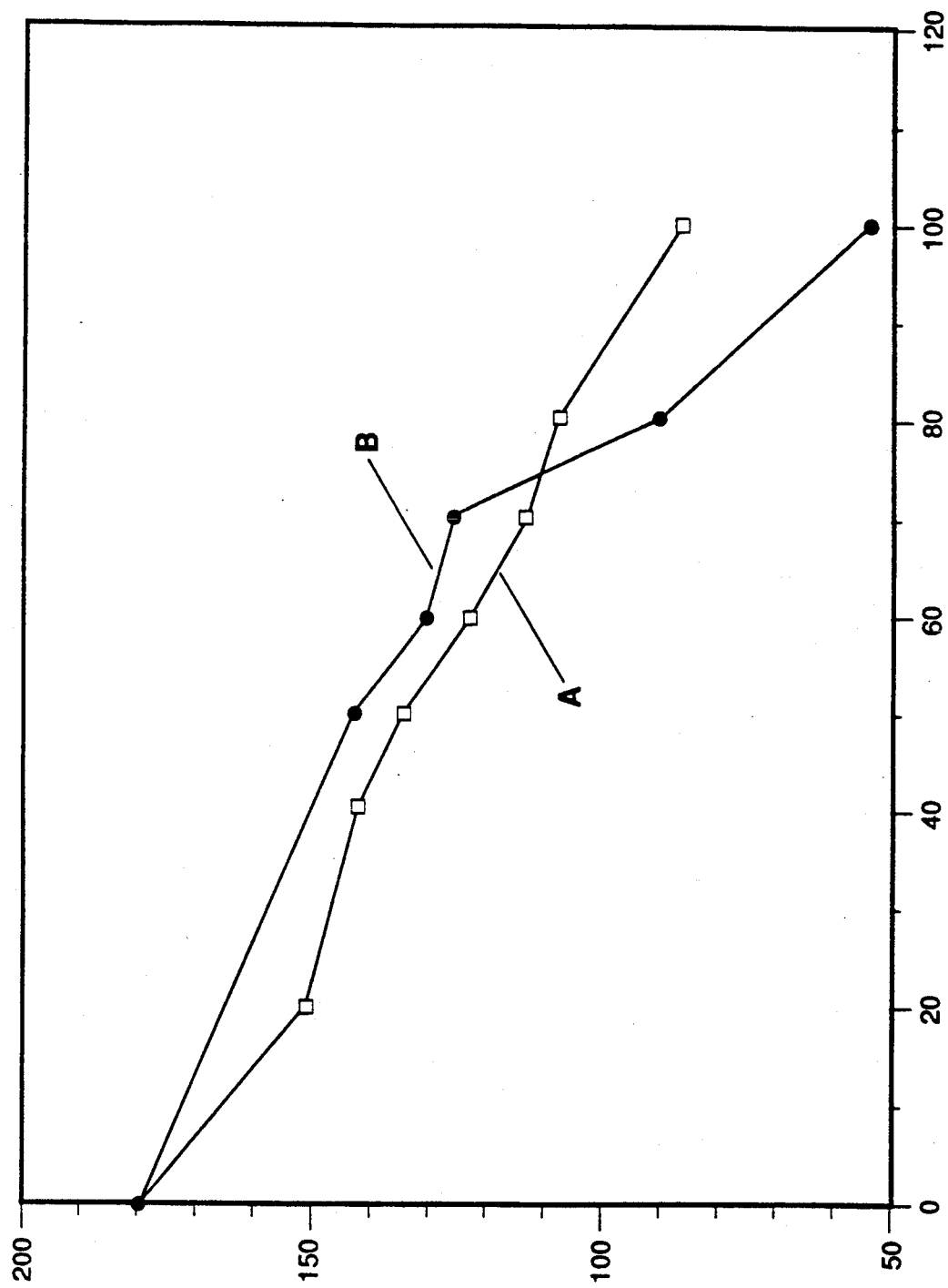
FIG. 1 is a graph where the abscissa is the volume percent of parachlorobenzotrifluoride (line A) or perchloroethylene (line B) mixed with orthochlorotoluene and the ordinate is the evaporation time in seconds.

This invention is for a mixture of solvents, where the mixture includes monochlorotoluene and monochlorobenzotrifluoride. The solvents used in the mixtures of this invention are available and can be purchased. Monochlorotoluene has the general formula

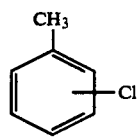

and monochlorobenzotrifluoride has the general formula

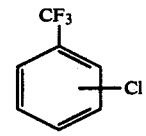

the three monochlorotoluene isomers—ortho, meta, and parachlorotoluene, orthochlorotoluene (OCT) is preferred because it is the least expensive. Of the three monochlorobenzotrifluoride isomers, parachlorobenzotrifluoride (PCBTF) is preferred because it is commercially available. Orthochlorobenzotrifluoride and metachlorobenzotrifluoride can be used, but metachlorobenzotrifluoride is the least desirable because it is too expensive. The invention contemplates a mixture of about 1 to about 99% monochlorotoluene and about 1 to about 99% monochlorobenzotrifluoride. A preferred mixture comprises about 30 to about 60 volume percent monochlorotoluene and about 40 to about 70 volume percent monochlorotriflouride. That mixture is preferred because it evaporates faster and has about the same solvency power as monochlorotoluene.

The mixture of monochlorotoluene and monochlorobenzotrifluoride can be made nonflammable by the addition of perchloroethylene (PERC). A three component mixture that is contemplated in this invention comprises about 10 to about 60 volume percent monochlorotoluene, about 10 to about 60 volume percent monochlorobenzotrifluoride, and about 30 to about 60 volume percent PERC. In that mixture, the total volume percent of monochlorotoluene and monochlorobenzotrifluoride must be less than 70 volume percent in order for the mixture to be nonflammable. If the solvent mixture is to be used in applications that require a rapid evaporation rate, it is preferable to use about 15 to about 30 volume percent monochlorotoluene, about 20 to about 40 volume percent monochlorobenzotrifluoride, and about 30 to about 60 volume percent PERC. If the mixture is to be used in applications that require good solvency for organic polymers, it is preferable to use about 40 to about 60 volume percent monochlorotoluene, about 10 to about 30 volume percent monochlorobenzotrifluoride, and about 30 to about 50 volume percent PERC.

Besides PERC, various other optional components can be included in the mixture of monochlorotoluene and monochlorobenzotrifluoride. About 0.01 to about 1.0 wt % of a stabilizer can be included in the mixture to trap decomposition products that may catalyze the decomposition of the components of the mixture. Stabilizers include compounds such as epoxides, glycidyl ethers, and diepoxides. The preferred stabilizer is allyl glycidyl ether because it is available and its boiling point is close to the boiling point of the solvent mixture.

About 0.0005 to about 0.1 wt % of an antioxidant can be included in the solvent mixture to act as a free radical inhibitor by scavenging free radicals such as monoatomic oxygen. Examples of antioxidants include hindered phenols such as thymol, hydroquinone monomethyl ether, and tertiary amyl phenol. Other examples of antioxidants include nitrogen ring compounds such as N-methyl pyrolle. Hindered phenols are preferred due to their low cost and availability.

About 0.001 to about 0.1 wt % of a corrosion inhibitor can be included in the mixture to prevent the mixture from attacking various metals with which it comes into contact. Examples of corrosion inhibitors include amines, such as ethyl morpholine and methyl morpholine. Other examples of corrosion inhibitors include acetates, glycol ethers, and imidazoles. The preferred corrosion inhibitor is ethyl morpholine because of its good performance and availability.

Because OCT has a pungent odor, it may be desirable to include about 0.01 to about 0.1 wt % of an odor mask in the mixture to hide its malodorous aroma. Most odor masks are sold as propriety compounds. "Sweet Mask," a proprietary odorant of an ester base sold by Alpine Fragrances, is the preferred odor mask because it masks the odor of OCT at a low concentration.

The following examples further illustrate this invention.

EXAMPLE 1

Figure 2:
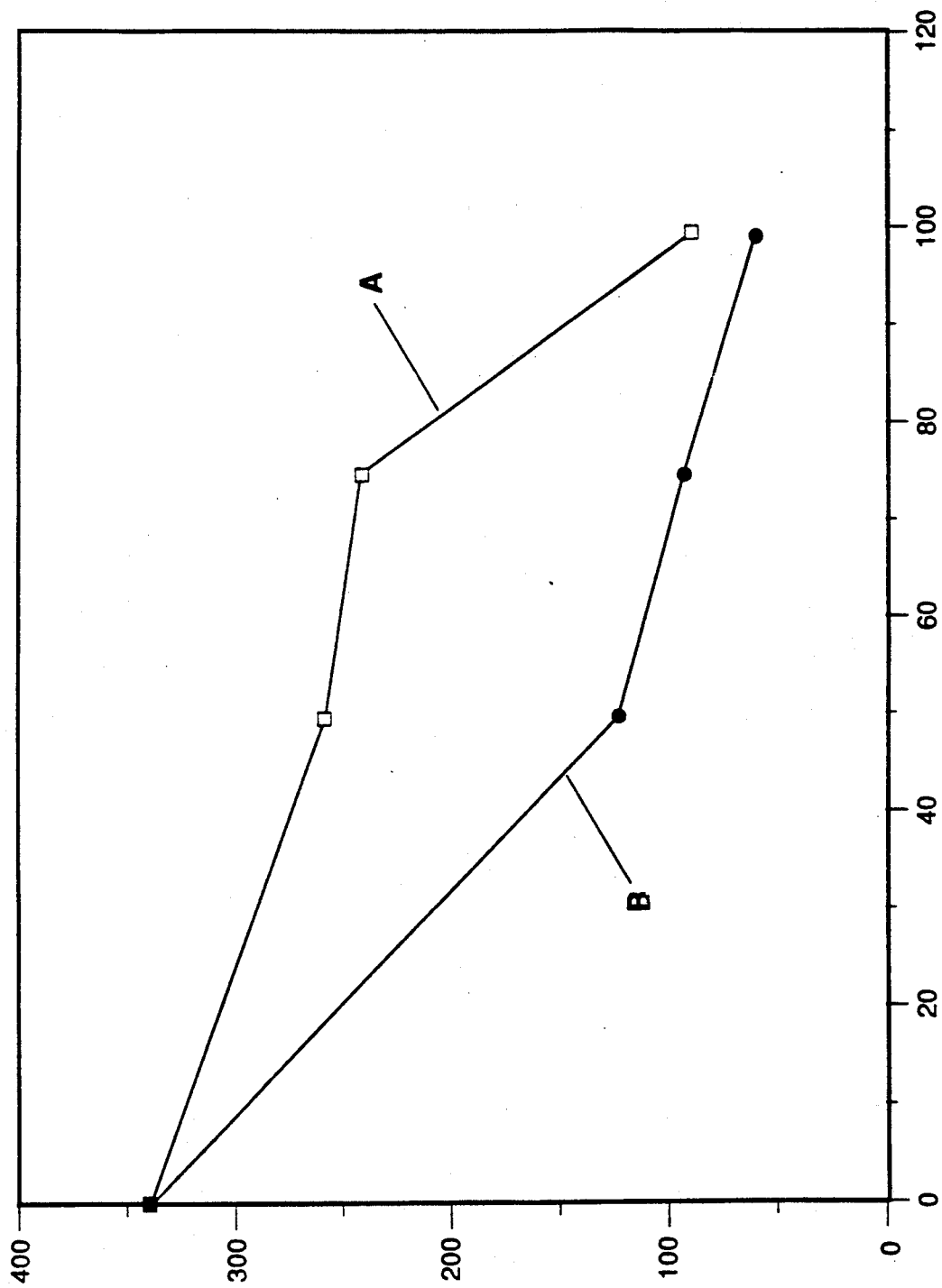
FIG. 2 is a graph where the abscissa is the volume percent of parachlorobenzotrifluoride (line A) or perchloroethylene (line B) mixed with mineral spirits and the ordinate is the evaporation time in seconds. Both graphs are further explained in Example 1.

Various mixtures were prepared of PCBTF with OCT and of PERC with OCT. The evaporation time of the mixtures was determined using ASTM Test D-1901-85, "Standard Test Method For Relative Evaporation Time Of Halogenated Organic Solvents And Their Admixtures." In this test, an aluminum plate having a scribe line 5 inches from one edge is inclined at an angle 60° with the scribe line horizontal. Ten mL of the solvent mixture is poured above the scribe line and the time required for the mixture to run from the scribe line to the bottom of the plate is measured. That measurement is then normalized against a butylacetate standard tested on the same plate at about the same time. The results of this test are given in FIG. 1. In FIG. 1, line A is for mixtures of PCBTF with OCT and line B is for mixtures of PERC with OCT. FIG. 1 shows that 100% PERC evaporates very fast (about 50 seconds) while 100% PCBTF requires almost twice as long (about 100 seconds) Thus, one would expect mixtures of PERC with OCT to evaporate much faster than mixtures of PCBTF with OCT. Indeed, FIG. 2 shows that when ASTM Test D-1901-85 was performed with mixtures of PERC and mineral spirits (i.e., branched chain $C_{12}$–$C_{14}$ hydrocarbons, which evaporate slowly) and mixtures of PCBTF and mineral spirits, the mixtures containing PERC (line B) did evaporate faster than the mixture containing PCBTF (line A), as expected. However, surprisingly, that is not what happened when mixtures of PCBTF and OCT were compared with mixtures of PERC and OCT. As the data in FIG. 1 shows, when the amount of PERC fell below about 74 volume percent in the PERC-OCT mixture, that mixture evaporated slower than did a comparable mixture of PCBTF with OCT.

EXAMPLE 2

A mixture of 20 volume percent PCBTF, 50 volume percent OCT, and 30 volume percent PERC ("253"), and a second mixture of 30 volume percent PERC, 20 volume percent OCT, and 50 volume percent PERC ("325") were prepared. Three grams of a polymeric substance was added every 24 hours to a 25 ml sample of each solvent mixture and to pure PCBTF and pure OCT. These samples were observed to determine whether or not the polymeric substances dissolved in the solvent. When no further polymeric substance would dissolve in the solvent, additional solvent was added until solution occurred to determine more precisely the total percent of the polymeric substance that could be dissolved in the mixture. The following table gives the results.

| Type Of Resin | 253 | 325 | PCBTF | OCT |
|---|---|---|---|---|
| Polybutene | >70% | >70% | >70% | >70% |
| Epoxy | 50% | 56% | <3% | 65% |
| Phenolic Resin | 58% | 54% | 53% | 65% |
| Polyterpene | 65% | 64% | 58% | 70% |
| Phthalate Ester (Polymer) | 36% | 40% | 31% | <40% |
| Glycerol Rosin | 67% | 67% | 60% | 75% |
| Acrylate Copolymer | >70% | >70% | >70% | >70% |
| Styrene Rubber | 38% | 30% | 32% | 30% |

The above table shows that the 253 and 325 compositions of this invention are nearly as good as OCT alone in dissolving the polymeric substances tested.

EXAMPLE 3

Various properties of the solvent mixtures prepared in Example 2 were tested and compared with PCBTF, OCT, and PERC. The following table gives the results. In the table, "550" is 50 volume % PCBTF, 50 volume % OCT, and 0 volume % PERC, and "73" is 70 volume % OCT and 30 volume % PERC.

| Properties | 253 | 550 | 325 | PCBTF | OCT | PERC | 73 |
|---|---|---|---|---|---|---|---|
| Evaporation Time, Sec | 125 | 104 | 82 | 86 | 170 | 54 | 150 |
| Flash Point, °F. | NFTB[1] | 113 | NFTB[1] | 109 | 123 | None | NFTB |
| Sp. Gr. @25° C. | 1.295 | 1.200 | 1.426 | 1.338 | 1.079 | 1.620 | 1.246 |
| Lbs/Gal | 10.81 | 10.02 | 11.91 | 11.17 | 9.00 | 13.5 | 10.40 |
| Kauri Butanol[2] | 109 | 92 | 100 | 64 | 110 | 90 | 110 |

[1] no flash to boiling
[2] ASTM Test No. D1133-86, "Standard Test Method For Kauri-Butanol Value of Hydrocarbon Solvents." The Kauri-Butanol test measures ability of the solvent to dissolve Kauri gum compared to butanol.

The above table shows that PCBTF is a poor solvent for Kauri gum while OCT, 73, and 253 are good solvents. The table also shows that 253 and 325 are nonflammable while 550, PCBTF, and OCT are flammable. 325 evaporates rapidly but 253 is a better solvent.

I claim:
1. A mixture comprising essentially of
   (a) about 40 to about 60 volume % monochlorotoluene; and
   (b) about 1 to about 60 volume % monochlorobenzotrifluoride.
2. A mixture according to claim 1 wherein said monochlorotolune is orthochlorotoluene.
3. A mixture according to claim 1 wherein said monochlorobenzotrifluoride is parachlorobenzotrifluoride.
4. A mixture according to claim 1 which includes
   (a) about 0.01 to about 1.0 weight % of a stabilizer;
   (b) about 0.0005 to about 0.1 weight % of an anti-oxidant;
   (c) about 0.001 to about 0.1 weight % of a corrosion inhibitor; and
   (d) about 0.01 to about 0.1 weight % of an odor mask.
5. A mixture according to claim 4 wherein said stabilizer is allyl glycidyl ether, said anti-oxidant is t-amyl phenol, and said corrosion inhibitor is N-ethyl morpholine.

6. A mixture consisting essentially of
   (a) about 40 to about 60 volume % orthochlorotoluene; and
   (b) about 40 to about 60 volume % parachlorobenzotrifluoride.

7. A mixture according to claim 6 which includes
   (a) about 0.01 to about 1.0 weight % of a stabilizer;
   (b) about 0.0005 to about 0.1 weight % of an anti-oxidant;
   (c) about 0.001 to about 0.1 weight % of a corrosion inhibitor; and
   (d) about 0.01 to about 0.1 weight % of an odor mask.

8. A mixture according to claim 7 wherein said stabilizer is allyl glycidyl ether, said anti-oxidant is t-amyl phenol, and said corrosion inhibitor is N-ethyl morpholine.

* * * * *